US011281492B1

(12) United States Patent
Rebeja et al.

(10) Patent No.: US 11,281,492 B1
(45) Date of Patent: Mar. 22, 2022

(54) MOVING APPLICATION CONTAINERS ACROSS COMPUTE NODES

(71) Applicant: Juniper Networks, Inc., Sunnyvale, CA (US)

(72) Inventors: Leonid Rebeja, Toronto (CA); Daniel Echegaray, Mississauga (CA)

(73) Assignee: Juniper Networks, Inc., Sunnyvale, CA (US)

( * ) Notice: Subject to any disclaimer, the term of this patent is extended or adjusted under 35 U.S.C. 154(b) by 341 days.

(21) Appl. No.: 16/428,717

(22) Filed: May 31, 2019

(51) Int. Cl.
*G06F 9/48* (2006.01)
*G06F 9/455* (2018.01)

(52) U.S. Cl.
CPC ............ *G06F 9/4856* (2013.01); *G06F 9/455* (2013.01)

(58) Field of Classification Search
CPC .... G06F 9/4856; G06F 3/0604; G06F 3/0647; G06F 3/067; G06F 9/455; H04L 67/148
See application file for complete search history.

(56) References Cited

U.S. PATENT DOCUMENTS

| 6,714,969 | B1* | 3/2004 | Klein | G06F 1/1616 |
| | | | | 709/219 |
| 9,225,661 | B1* | 12/2015 | Yang | H04L 67/1002 |
| 9,348,646 | B1* | 5/2016 | Daya | G06F 9/4856 |
| 9,672,054 | B1* | 6/2017 | Gupta | G06F 9/45533 |
| 9,874,924 | B1* | 1/2018 | Li | G06F 9/45558 |
| 10,230,785 | B1* | 3/2019 | Gadalin | H04L 67/1097 |
| 10,860,363 | B1* | 12/2020 | Gabrielson | G06F 9/4418 |
| 2006/0005189 | A1* | 1/2006 | Vega | G06F 9/4856 |
| | | | | 718/1 |
| 2007/0168861 | A1* | 7/2007 | Bell | G06F 3/0481 |
| | | | | 715/701 |
| 2011/0119748 | A1* | 5/2011 | Edwards | G06F 9/45558 |
| | | | | 726/12 |
| 2011/0202640 | A1* | 8/2011 | Pillutla | G06F 9/5077 |
| | | | | 709/221 |

(Continued)

OTHER PUBLICATIONS

"Juke Multicloud Storage and Compute," Cross-cloud container application development made easy, Juniper Networks, Inc., Apr. 2019, 12 pp.

(Continued)

*Primary Examiner* — Benjamin C Wu
(74) *Attorney, Agent, or Firm* — Shumaker & Sieffert, P.A.

(57) ABSTRACT

In general, this disclosure describes techniques for seamlessly migrating containers among or within computing infrastructures so as to preserve the integrity of data, the configurations, and the availability of the attached storage volumes for the containers. For example, a controller having a distributed software architecture may orchestrate, according to container migration workflow, components of the container migration application to accomplish a set of container migration tasks for a container to be moved. The container migration tasks include copying the live container to a target node, recreating the network configuration for the container on the target node, and reattaching any storage volume to the container on the target node. The container is, in this way, seamlessly migrated from a node on which it is currently executing to a different target node, and the controller may issue a command to start executing the container on the target node.

17 Claims, 7 Drawing Sheets

(56) References Cited

U.S. PATENT DOCUMENTS

| | | | |
|---|---|---|---|
| 2014/0007089 A1* | 1/2014 | Bosch | G06F 9/5077 718/1 |
| 2014/0289365 A1* | 9/2014 | Watanabe | H04L 61/2046 709/217 |
| 2015/0355983 A1* | 12/2015 | Harper | G06F 11/2046 714/4.11 |
| 2015/0378768 A1* | 12/2015 | Conover | G06F 9/45558 718/1 |
| 2016/0188353 A1* | 6/2016 | Shu | G06F 9/45558 718/1 |
| 2016/0274926 A1* | 9/2016 | Narasimhamurthy | G06F 9/45558 |
| 2017/0199770 A1* | 7/2017 | Peteva | G06F 9/5088 |

OTHER PUBLICATIONS

U.S. Appl. No. 16/118,107, filed Aug. 30, 2018 and entitled "Multiple Virtual Network Interface Support for Virtual Execution Elements".

U.S. Appl. No. 16/355,289, filed Mar. 15, 2019 and entitled "Storage Volume Replication Across Multiple Data Centers".

Bielicki, "LizardFS Documentation," accessed from https://buildmedia.readthedocs.org/media/pdf/lizardfs-docs/stable/lizardfs-docs.pdf, accessed on Jun. 15, 2018, 147 pp.

"LizardFS, White paper Version 3.12," accessed from https://lizardfs.com/wp-content/uploads/2018/06/whitepaper_lizard_v3.12_web.pdf, Jun. 2018, 23 pp.

"LizardFS, White paper Version 3.10," accessed from https://lizardfs.com/wp-content/uploads/2017/01/LizardFS-WhitePaper-Eng-v9-3.10-web-18oct-small.pdf, Jan. 2017, 20 pp.

"Introduction to LizardFS," LizardFS Handbook, accessed from https://docs.lizardfs.com/introduction.html, accessed on May 7, 2020, 4 pp.

"What Lizard Gives You," Lizard FS, accessed from https://lizardfs.com/, accessed on May 7, 2020, 4 pp.

"LizardFS is an Open Source Distributed File System licensed under GPLv3," GitHub, LizardFS, accessed from https://github.com/lizardfs/lizardfs, accessed on May 7, 2020, 2 pp.

"Welcome to LizardFS's documentation," LizardFS Handbook, accessed from https://docs.lizardfs.com/, accessed on May 7, 2020, 3 pp.

YouTube, "FOSDEM 2017—Storage overloaded to smoke? Legolize with LizardFS!," uploaded by LizardFS Software Defined Storage, Feb. 7, 2017, accessed from https://www.youtube.com/watch?v=gz3XAfAbfxl, 1 pp.

YouTube, "LizardFS on FOSDEM 2018 "Year in Development,"" uploaded by LizardFS Software Defined Storage, Mar. 2, 2018, accessed from https://www.youtube.com/watch?v=vpaanFRRjBk, 1 pp.

YouTube, "LizardFS as a storage for Elasticsearch," uploaded by LizardFS Software Defined Storage, Sep. 14, 2018, accessed from https://www.youtube.com/watch?v=jSodzbA2o9I, 1 pp.

YouTube, "LizardFS Intro," uploaded by LizardFS Software Defined Storage, Aug. 7, 2018, accessed from https://www.youtube.com/watch?v=oPASAHS2-D0, 1 pp.

YouTube, "LizardFS presentation," uploaded by LizardFS Software Defined Storage, Mar. 28, 2018, accessed from https://www.youtube.com/watch?v=H9dOue6EJz0, 1 pp.

YouTube, "FOSDEM 2018 Lizardfs Opennebula Connector release," uploaded by LizardFS Software Defined Storage, Mar. 2, 2018, accessed from https://www.youtube.com/watch?v=MFP1CvggpEM, 1 pp.

YouTube, "LizardFS Software Defined Sotrage," uploaded by LizardFS Software Defined Storage, Aug. 16, 2016, accessed from https://www.youtube.com/watch?v=ILjZD97Lbo4, 1 pp.

YouTube, "LizardFS @ Platige Image," uploaded by LizardFS Software Defined Storage, Jun. 22, 2016, accessed from https://www.youtube.com/watch?v=dZ4Fx48d3jM, 1 pp.

YouTube,"LizardFS native Windows client," uploaded by LizardFS Software Defined Storage, Jun. 21, 2016, accessed from https://www.youtube.com/watch?v=KKDaeVALHV4, 1 pp.

* cited by examiner

Workloads

| | Name | Node | IPV4 | Type | Volumes | Status | Actions |
|---|---|---|---|---|---|---|---|
| ☐ | d-centos-9982225771-1e9a500... | nde-15-test-1 | 192.168.1.101 | Persistent | 1 | Running | ... |

Showing 1 to 1 of 1 entries 301, 303, 304

Workloads — 301

| ☐ | Name | Node | IPv4 | Type | Volumes |
|---|------|------|------|------|---------|
| ☐ | d-centos-998225771-1s9n30i... | nde-15-test-1 | 192.168.1.101 | Persistent | 1 |

Showing 1 to 1 of 1 entries

Notifications — 317

↻ Moving container d-centos-998225... ← 319

MOVING APPLICATION CONTAINERS ACROSS COMPUTE NODES

TECHNICAL FIELD

This disclosure relates to virtualized computing infrastructure and, more specifically, to migrating containers with virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, this disclosure describes techniques for seamlessly migrating containers among or within computing infrastructures so as to preserve the integrity of data, the configurations, and the availability of the attached storage volumes for the containers. For example, a controller having a distributed software architecture may orchestrate, according to container migration workflow, components of the container migration application to accomplish a set of container migration tasks for a container to be moved. The container migration tasks include copying the live container to a target host computing device ("target node"), recreating the network configuration for the container on the target node, and reattaching any storage volume to the container on the target node. The container is, in this way, seamlessly migrated from a node on which it is currently executing to a different target node, and the controller may issue a command to start executing the container on the target node.

The techniques may provide one or more technical improvements having at least one practical application. For example, the techniques may provide a simple, scalable, and seamless way to effectively, and with data integrity, migrate containers from one computing infrastructure to another, or from one computing device to another within a particular computing infrastructure. As a result, customers need not be tied to a particular cloud service provider for executing customer containers, but may instead easily switch to another cloud service provider or to local/on premises computing infrastructure, for reasons of price or performance for example, with little or no downtime or other negative effects on the performance of the customer applications that include the customer containers. In addition, because the techniques include migrating both the storage volume(s) (by reattaching the storage volume(s) to the container copied to the target node) and the network configuration, migration of a container as described herein may reduce and, in some cases, eliminate any requirement to reconfigure other containers with which the migrated container interacts.

In one example, a method includes receiving, by a controller, a migration request to migrate a currently executing first container from a node to a target node, wherein the first container has a storage volume attached to and for use by the first container to read and write application data, wherein the storage volume is located on a remote storage node; and in response to receiving the migration request, performing, by the controller, container migration tasks comprising: copying the first container from the node to the target node to create a second container that is a copy of the first container; attaching the storage volume to the second container on the target node for use by the second container to read and write application data; and starting the second container to execute by the target node.

In another example, a computing system includes one or more processors; and at least one computer-readable storage medium storing instructions that, when executed, cause the one or more processors to: receive a migration request to migrate a currently executing first container from a node to a target node, wherein the first container has a storage volume attached to and for use by the first container to read and write application data, wherein the storage volume is located on a remote storage node; and in response to receiving the migration request, perform container migration tasks that cause the one or more processors to: copy the first container from the node to the target node to create a second container that is a copy of the first container; attaching the storage volume to the second container on the target node for use by the second container to read and write application data; and starting the second container to execute by the target node.

In another example, a computer-readable storage medium storing instructions that are executable by at least one processor to: receive, by a controller for a set of containers, a migration request to migrate a currently executing first container from a node to a target node, wherein the first container has a storage volume attached to and for use by the first container to read and write application data, wherein the storage volume is located on a remote storage node; and in response to receiving the migration request, perform, by the controller, container migration tasks comprising: copying the first container from the node to the target node to create a second container that is a copy of the first container; attaching the storage volume to the second container on the target node for use by the second container to read and write application data; and starting the second container to execute by the target node.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the text and figures.

DETAILED DESCRIPTION

In some data centers, a large collection of interconnected computing devices (e.g., real or virtual servers) may provide computing and/or storage capacity for execution of various applications. For instance, a data center may comprise a facility that hosts applications and services for customers of the data center, which may comprise a local or remote data center. In some frameworks, storage management systems are exclusively tied to one particular type of data center (e.g., a cloud data center with a particular type of computing infrastructure provided by a particular service provider or company). If a customer's storage infrastructure is tied only to one particular computing infrastructure or cloud service provider, the customer's system may experience data access issues or outright failure if that computing infrastructure or cloud service provider itself experiences failure or downtime. In addition, for these types of frameworks, the customer's containers, which access stored data in the system, are not capable of seamlessly migrating among computing devices.

Figure 1:
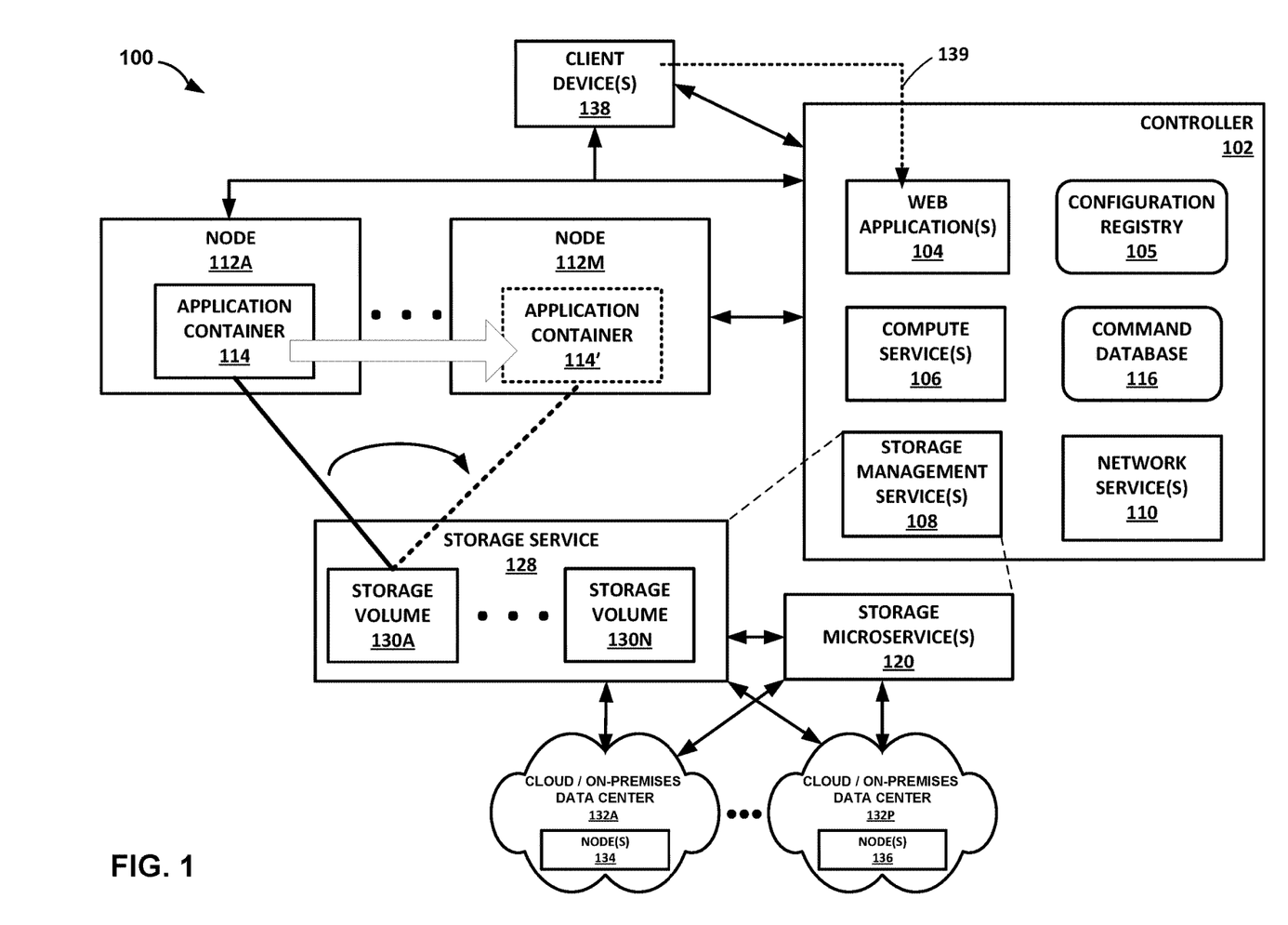
FIG. 1 is a block diagram illustrating an example system in which application containers, to which are attached storage volumes, may be migrated among computing devices within or across cloud and/or on-premises computing infrastructures, in accordance with one or more techniques of the disclosure.

FIG. 1 is a block diagram illustrating an example system 100 in which application containers, to which are attached storage volumes, may be migrated among computing devices within or across cloud and/or on-premises computing infrastructures, in accordance with one or more techniques of the disclosure. As illustrated in FIG. 1, data centers 132A-132P (collectively, "data centers 132") may include one or more on-premises (or on-site) data centers, which may be local to a customer or client site (e.g., local to client devices 138, and geographically co-located with client devices 138). Data centers 132 may also include one or more cloud data centers that are remote from the customer or client site and that are provided and/or maintained by one or more respective service providers (e.g., geographically remote from client devices 138). For example, data center 132A may be provided and/or maintained by one particular third-party service provider (e.g., service provider "A"), and data center 132P may be provided and/or maintained by a different third-party service provider (e.g., service provider "P"). Each one of data centers 132 may be physically located at one geographical location or distributed among different geographical locations.

In general, one or more of data centers 132 may include a computing infrastructure that provides an operating environment for applications and services for computing devices ("nodes") that are included in or coupled to the respective data center. One or more of data centers 132 may, for example, host infrastructure equipment, such as networking and storage systems, redundant power supplies, and environmental controls. In some examples, a service provider network that couples nodes to one or more of data centers 132 may be coupled to one or more networks administered by other providers and may thus form part of a large-scale public network infrastructure, e.g., the Internet.

In some examples, data centers 132 may each represent one or more geographically distributed network data centers. Data centers 132 may be facilities that provides network services for customer devices (e.g., one or more client devices 138), which may be, e.g., devices of entities such as enterprises and governments or individuals. For example, a data center may host web services for several enterprises and end users. Other example services may include data storage, virtual private networks, traffic engineering, file service, data mining, scientific- or super-computing, and so on. In some cases, data centers 132 may include individual network servers, network peers, or otherwise.

In various examples, one or more of data centers 132 may each include a set of storage systems and application servers interconnected via an Internet protocol (IP) fabric, which may comprise a fabric provided by one or more tiers of physical network devices, such as, for example, routers, gateways, switches, hubs, modems, bridges, repeaters, multiplexers, servers, virtual machines running on one or more of the same, and other example network devices. In certain examples, the IP fabric may include three tiers of devices: one or more spine devices, one or more aggregation devices, and one or more leaf devices. Other topologies may be used in other examples. The servers may provide execution and storage environments for applications and data associated with customer devices and may be physical servers, virtual machines or combinations thereof.

As noted above, data centers 132 may include one or more on-premises (or on-site) data centers, which may be local to client devices 138, as well as one or more cloud data centers (e.g., third-party or public cloud data centers), which are remote from client devices 138. In some cases, data centers 132 include one or more third-party cloud data centers. Each of data centers 132 may include or otherwise be communicatively coupled to one or more nodes, such as control nodes, storage element nodes (e.g., chunk servers), compute nodes, network nodes, and the like. For instance, as shown in FIG. 1, data center 132A includes one or more nodes 134, and data center 132P includes one or more nodes 136.

System 100 illustrated in FIG. 1 also includes one or more client devices 138, a controller 102, and one or more additional nodes 112A-112M (hereinafter, "nodes 112"). Each of nodes 102 and/or 112 may comprise one or more physical, virtual devices, or other entities, such as one or more computing devices, server devices, real servers, virtual servers, client devices, virtual machines, or the like. Client devices 138 may be communicatively coupled to controller 102 and/or nodes 112. In addition, controller 102 may be communicatively coupled to each of nodes 112. Controller 102 may be a decentralized controller implemented using multiple computing devices, such as any one or more of nodes 134, 136.

Controller 102 and each of nodes 112 may be located in one of data centers 132 or another data center. For example, nodes 134 of data center 132A may include controller 102, which may itself be multiple separate computing nodes each executing one or more of the components illustrated within controller 102. Nodes 134 of data center 132A may include node 112A, nodes 136 of data center 132P may include node 112M, and so forth. Thus, nodes 112 may be deployed by different cloud service providers or customers, may be located in separate data centers operated by different providers or customers, may be configured to operate within different types of cloud computing infrastructures, and so on.

An automation platform may automate deployment, scaling, and operations of containers across nodes 134, 136 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Controller 102 allows orchestration platforms to more easily migrate workloads across private and public cloud infrastructure stacks by making the infrastructure layer more transparent to applications. The infrastructure layer includes storage, network, and compute resources. Controller 102 may provide northbound APIs to the provisioning system and orchestration platforms for invoking any of compute services 106, storage management services 108, and network services 110, described further below.

Controller 102 may include various different services or applications. As shown in the example of FIG. 1, controller 120 includes one or more web applications 104, one or more compute services 106, one or more network services 110, and one or more storage management services 108. Each of the services or applications provided by controller 102 may be implemented or executed in one or more application containers that are deployed by controller 102. Any of web applications 104, compute services 106, network services 110, and storage management services 108 may be implemented as one or more microservices deployed or executed in one or more application containers.

Web applications 104 may include or more web applications having interfaces presented on client devices 138, including applications that provide graphical user interface functionality. Web applications 104 may include a web server that serves web pages to browsers of client devices 138. Compute services 106 may provide various compute and processing functionality in system 100. For example, compute services 106 may facilitate high-availability, resiliency, and horizontal scaling of compute resources in system 100.

Network services 110 may includes networking and network management services to system 100. For example, network services 110 may represent a software-defined networking solution for container that can run multiple virtual networks, e.g., VLANs. Network services 110 may facilitate, for instance, support for inter- and intra-node (multicloud) communication over the network for containers, isolation of container and application traffic from other traffic coming from any other virtual network or host, elimination of overlapping ports in applications, generation of any number of container instances and the ability to let the instances all listen on the same port, so clients may avoid having to perform port discovery, running applications that require intra-cluster connectivity, and creation of multiple virtual networks to isolate different portions of the computing infrastructure and/or organization.

Storage management services 108 may provide storage management functionality in system 100, including management of storage volumes that are included or otherwise provided by storage management services 108. As shown in FIG. 1, storage management services 108 may include storage service 128 and storage microservice 120. Each of storage service 128 and storage microservice 120 may, in some examples, be implemented or executed in one or more application containers. Storage service 128 and storage microservice 120 may provide a persistent data storage layer that is virtually positioned over data centers 132. Through implementation of storage service 128 and storage microservice 120, client devices 138 and nodes 102, 112 may obtain access to data centers 132 and corresponding data center nodes (e.g., nodes 134,136) via this persistent data storage layer. Rather than directly accessing data that is stored on data centers 132, client devices 138 and nodes 102, 112 may access virtual data referred to as storage volumes 130, which are associated with data stored directly on storage devices within data centers 132. These storage volumes 130 are provided by storage service 128, and storage volumes 130 may be attached to individual application containers, such as application container 114 or application container 114', which may then access any attached storage volumes 130 for data read and/or write operations for application data that is associated with the respective storage volumes. Storage volumes 130 may be associated with an amount of virtual, collective storage data provided by data centers 132. For example, if data centers 132 collectively provide 100 terabytes (TB) of data that is allocated in system 100, storage volumes 130 collectively may be associated with this 100 TB of data and may enable virtual access to such data by client devices 138 and nodes 102, 112. Storage volumes 130 may be located on remote storage nodes (or "storage servers") and available to be attached to different nodes 112.

Storage microservice 120 manages the seamless detaching and re-attaching of storage volumes 130 to different application containers (e.g., application containers 114, 114'). For instance, in some examples, storage service 128 may create a particular storage volume (e.g., storage volume 130A), where storage volume 130A is, in certain examples, attachable to only one application container at a time (e.g., only one of application containers 114, 114'). Storage service 128 may, in some instances, create storage volume 130A responsive to receiving user input from client devices 138 via web applications 104 to create the volume, and/or responsive to a request from an individual node or container (e.g., node 112A or container 114). Although not shown in FIG. 1, in some examples, storage volume 130A may be attachable to more than one application container at a time (e.g., attached to both application container 114 and application container 114' at the same time).

Storage service 128 or an application container may then attach storage volume 130A to the application container in which one or more applications are executable. For example, node 112A may comprise a real and/or virtual service. Node 112A may host an application container 114 for providing workload functionality by, e.g., being deployed with a microservice for an application. Additional details of the operation of storage management service(s) 108, including storage service 128 and storage microservice(s) 120, are described in U.S. application Ser. No. 16/355,289, filed Mar. 15, 2019 and entitled "Storage Volume Replication Across Multiple Data Centers," which is incorporated herein by reference in its entirety. An example of a container-centric cloud computing environment with description of virtual networks, orchestration, and software-defined networking is found in U.S. application Ser. No. 16/118,107, filed Aug. 30, 2018 and entitled "MULTIPLE VIRTUAL NETWORK INTERFACE SUPPORT FOR VIRTUAL EXECUTION ELEMENTS," which is incorporated herein by reference in its entirety.

In accordance with techniques described herein, controller 102 migrates application container 114 executing on node 112A to node 112M (thereafter for continued execution as application container 114'). Application containers may alternatively be referred to herein more simply as "containers." "Container-based" or "operating system" virtualization refers to the virtualization of an operating system to run multiple isolated systems on a single machine (virtual or physical). Such isolated systems represent application containers (or, more simply, "containers"), such as those provided by container platforms including the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host node as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional examples of containerization methods include OpenVZ, FreeBSD jail, AIX Workload partitions, and Solaris containers. Accordingly, as used herein, the term "application containers" or "containers," and containers 114, 114', may encompass not only LXC-style containers but also any one or more of virtualization engines, virtual private servers, silos, or jails. Containers may be ephemeral or persistent. The techniques described in this disclosure enable migration of persistent containers. Accordingly, containers 114, 114' may be persistent.

LXD is a next generation system container manager and makes use of LXC. LXD is a daemon that exposes an API over a local operating system socket and, if enabled, over a network to which the host executing LXD is attached. A user or local or remote process can issue a snapshot command, using a LXD command line or the LXD API for instance, to LXD to capture a snapshot of an executing container from the node on which the container is executing, the snapshot including the entirety of the container's state, such as the container configuration, devices, and file system. The snapshot may also include the running state (if the command so specifies). A user or local or remote process can issue a command to LXD to restore a snapshot to create a container (e.g., container 114'), ready for execution, from a previously-created snapshot. A restored snapshot may have the same MAC address as the container from which the snapshot was created. A user or local or remote process can issue a copy command to LXD to create a new container, from a previously created snapshot, that will be identical to the snapshotted container with the exception of volatile information (e.g., the MAC address) being reset.

Controller 102 includes a configuration registry 105 to store configurations for application containers and a command database 116 to store commands for execution by any of compute service(s) 106, storage management service(s) 108, and network service(s) 110. When controller 102 receives commands or configuration data for a container, controller 102 may store a representation of this configuration data to configuration registry 105 for the container. Any of web application 104, compute services 106, storage management services 108, and network services 110 may query the configuration registry 105 to obtain configuration data for the container. Configuration data may include network configuration data for a container, such as a port, bridge, Media Access Control (MAC) address, Internet Protocol (IP) address, gateway, Domain Name Service (DNS) services, and Dynamic Host Configuration Protocol (DHCP) lease information and/or settings for obtaining an IP address for the container. The type of network a container uses, whether it is a bridge, an overlay, a macvlan network, or a custom network plugin, may be transparent from within the container. Configuration data may include storage volume data, such as an identifier, location, or other information usable for attaching the storage volume to a container.

Client device 138 may issue, to web application 104, a migration request 139 to migrate application container 114 to node 112M, which is specified as the target node for the migration of application container 114. Client device 138 may be a customer device that executes a browser-based or other graphical user interface client for web application 104. However, web application 104 may be another application server for receiving a migration request from a client application, such as a command-line interface application that receives a migration request entered into a terminal executed by client device 138.

Migration request 139 may specify an application container identifier for application container 114 and a node identifier for target node 112M. The application container identifier may be a unique identifier within the scope of containers managed by controller 102. The application container identifier may be an alphanumeric string, an integer, or other value, for instance. Migration request 139 may also specify the operation being requested, i.e., container migration.

In response to migration request 139, web application 104 orchestrates, according to a container migration workflow, other components of controller 102 to perform a set of container migration tasks to seamlessly migrate container 114 from node 112A to target node 112M for deployment as container 114'. Use of the prime (') character is used to indicate that container 114' is a different container instance than is container 114, however, container 114' may have the same container image, network configuration, state data, application data, running/execution data, and/or attached storage volume(s) 130 as container 114.

In some examples, to direct compute service 106, storage management service 108, and network service 110, web application 104 may store API commands for execution by a background process to command database 116. The background process (not shown) may be part of a web application framework that includes web application 104. The background process continually queries the command database 116 for new commands and executes the commands to invoke compute services 106, storage management services 108, and network services 110 to perform one or more discrete tasks. In some examples, an API gateway (not shown) may receive commands from web application 104 and direct each of the commands to the appropriate one of compute service 106, storage management service 108, and network service 110 for execution. In some examples, compute services 106, storage management services 108, and network services 110 communicate with cloud service provider orchestration and/or software-defined networking controllers to request that tasks be performed, e.g., with respect to a particular node 134, 136. For example, the compute services 106, storage management services 108, and network services 110 may communicate with the cloud service provider orchestration and/or software-defined networking controllers using APIs exposed by the cloud service provider orchestration and/or software-defined networking controllers to perform one or more of the container migration tasks (e.g., copying the container 114' to target node 112M, attaching storage volume 130A, and starting container 114').

The container migration tasks include copying the live, presently executing container 114 to target node 112M for execution as container 114', configuring the network configuration for the container 114 on the target node 112M, and reattaching storage volume 130A to the container on the target node 112M (as illustrated by the migration arrow for the connections between storage volume 130A and application containers 114, 114'). The container 114 is in this way seamless migrated by controller 102 from source node 112A to target node 112M, and controller 102 may issue a command to start executing container 114' on the target node 112M.

Figure 2:
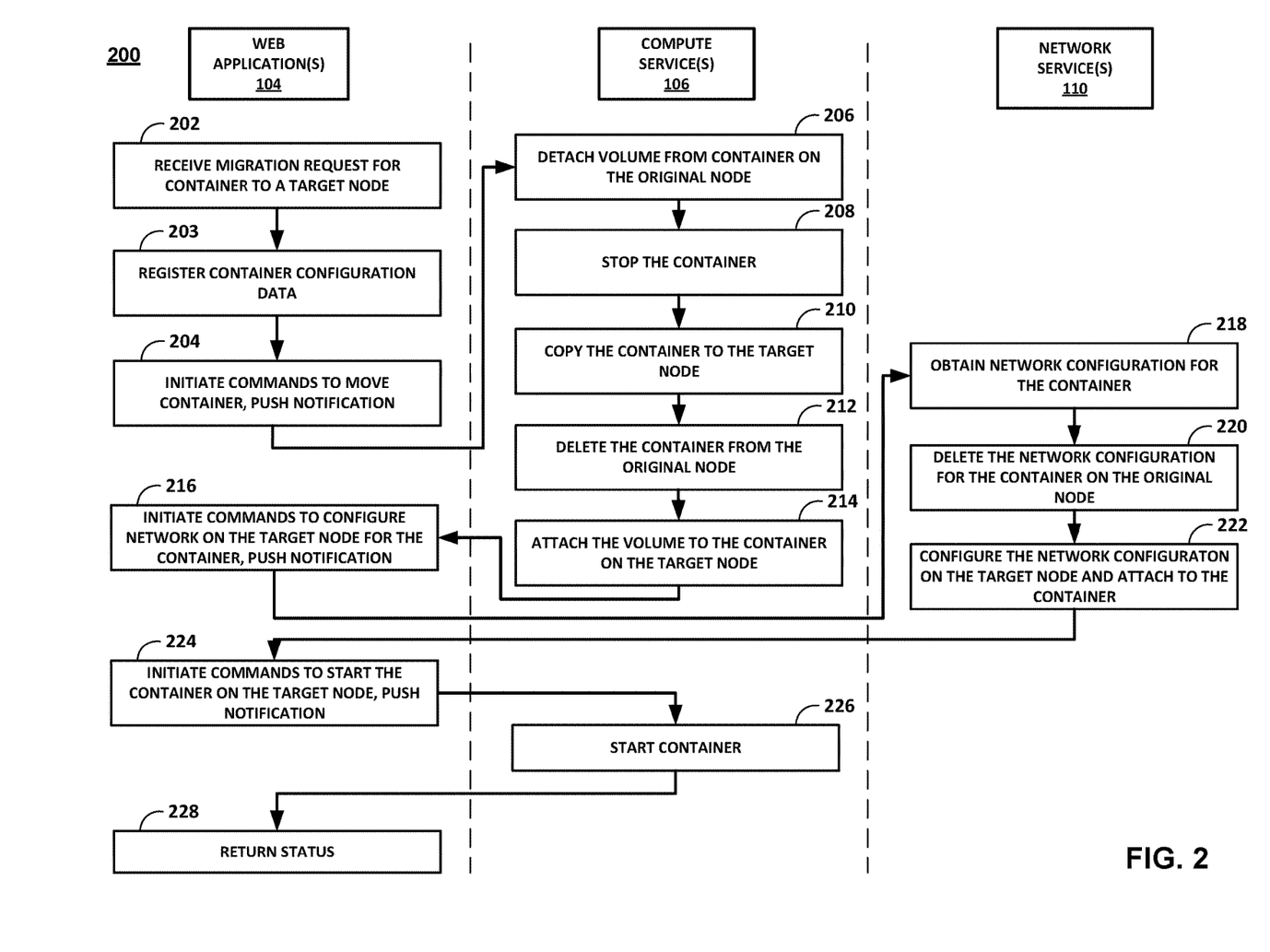
FIG. 2 is a flowchart illustrating an example mode of operation for a controller to migrate a container to a target node, according to techniques described in this disclosure.

FIG. 2 is a flowchart illustrating an example mode of operation for a controller to migrate a container to a target node, according to techniques described in this disclosure. A client device may send, to web applications 104, a migration request 139 (FIG. 1). Web applications 104 receives the migration request 139, which may specify an identifier for each of the container and a target node to which the container is to be migrated (202). In some cases, the migration request 139 may specify an identifier of a current or source node on which the container is executing. Web applications 104 may, in response to receiving migration request 139, parse information about the container in order to register (store) container configuration data to configuration registry 105 (203). The container configuration data may include an assigned one or more virtual network(s); other network configuration information such as port, MAC address, IP address, bridge/macvlan, and/or other network configuration information; and/or attached one or more storage volume(s) 130. Web applications 104 then initiates commands to move the container to the target node specified in migration request 139 and outputs a notification of the status of the migration (204). The status of the migration may indicate that the controller 102 is in the process of moving or copying the container to the target node. The notification may be an indication on a user interface, such as a web browser-based interface to web applications 104.

In some examples, the commands include API calls that invoke API methods of an API exposed by compute services 106. Web applications 104 may store the commands to command database 116, which a background process for web applications 104 may obtain and execute by sending commands to APIs for services 106, 108, and 110. Commands may be RESTful API requests having JSON or XML payloads, e.g., to direct the services 106, 108, 110 to perform the requested tasks using the data specified in the payloads.

Compute services 106 receives the one or more commands to move the container. Compute services 106 may obtain each command serially from web applications 104 and, after completing the corresponding task, reply with a result. Commands issued by compute services 106, network services 110, or storage management services 108, to nodes 112 may conform to LXC or LXD (LXC/LXD) commands for accomplish the described task or may conform to commands for a different container platform, such as those listed above.

To move the container to target node 112M, compute services 106 detaches storage volume 130A from container 114 (206). For example, compute services 106 may issue an LXC/LXD command for storage volume detach and/or may issue a command to unmount storage volume 130A from node 112A. Compute services 106 stops container 114 from executing on node 112A (208) and copies container 114 to target node 112M (210). To copy the container, compute services 106 may issue a snapshot command to node 112A to create a snapshot of container 114. (In some cases, compute services 106 stops container 114 after node 112A creates the snapshot.) Compute services 106 may direct node 112A to store the snapshot to a storage volume 130 mounted to node 112A, e.g., for general-purpose data storage by node 112A. Compute services 106 may then also mount that storage volume 130 to node 112M to permit node 112M to obtain and restore the snapshot of container 114. Alternatively, compute services 106 may issue a command to storage management services 108 to replicate the snapshot to a storage volume 130 already mounted to node 112M. Compute services 106 may further issue a command to the node 112M to restore the snapshot as container 114'. Container 114' may not be executing (i.e., stopped) at this point in the migration workflow.

Once the compute services 106 has caused the container 114' to be loaded to the target node 112M, compute services 106 issues a command to node 112A to delete container 114 (212). Compute services 106 further issues a command to node 112M to attach storage volume 130A to container 114' (214). To cause storage volume 130A to be attached to container 114', compute services 106 may mount storage volume 130A to node 112M and/or may issue a LXC/LXD command to node 112M to perform a storage attach operation to attach the storage volume 130A to container 114'. By performing the above tasks, compute services 106 migrates the container 114 along with the attached storage volume 130A. Compute services 106 may reply to web applications 104 with a status to indicate whether copying the container 114 to target node 112M and reattaching storage volume 130A was successful. If the copying was not successful, compute services 106 may reply with a reason for the error.

The container having been copied to target node 112M, web applications 104 initiates commands to configure a network configuration on target node 112M for container 114' (216). Web applications 104 may also output a notification of the status of the migration (216). The status of the migration may indicate that controller 102 is in the process of configuring the network configuration for container 114'. If compute services 106 was unable to complete one or more of the tasks, web applications 104 may output an indication that the migration process has failed and, in some cases, specify a reason for the failure.

Network services 110 obtain the network configuration for the container 114' (218). For instance, web applications 104 may query the configuration registry 105 for container 114 to obtain previously registered configuration data for container 114, including the network configuration. Web applications 104 may send this network configuration to network services 110 in one or more commands directing network services 110 to delete the previous network configuration for container 114 on node 112A, configure target node 112M within a network configuration for container 114', and attach the network configuration to container 114'. Network services 110 reconfigures node 112A (on which container 114 previously executed) to delete the network configuration for container 114 on node 112A (220). Network services 110 configures target node 112M with the network configuration and attaches the new network configuration on target node 112M to container 114' (222). To configure the new network configuration, network services 110 may, for instance, create a new virtual network, create a port for container 114' and map it to the new virtual network, set a gateway address or DHCP address for the virtual network, configure a macvlan, configure a virtual router, configure a virtual network interface between a virtual router and the container 114'. Container 114' may query the DHCP server to obtain an IP address, e.g., for the virtual network. In some cases, because container 114' is a restored snapshot of container 114 including the MAC address for container 114, container 114' may request and receive the previously-assigned IP address for its MAC address from the DHCP server. In this way, other applications may communicate with container 114' using the same virtual network address used by container 114 prior to migration.

By performing the above tasks, network services 110 configures the network configuration for container 114' on the target node 112M in a manner that allows the container 114' to communicate with other applications in manner identical, from the perspective of container 114', to that of container 114. Network services 110 may reply to web applications 104 with a status to indicate whether the network configuration was successful. If the network configuration was not successful, network services 110 may reply with a reason for the error.

The network configuration for container 114' having been configured on target node 112M, web applications 104 initiates commands to start container 114' (224). Web applications 104 may also output a notification of the status of the migration (224). The status of the migration may indicate that controller 102 is in the process of starting container 114'. If network services 110 was unable to complete one or more of the tasks, web applications 104 may output an indication that the migration process has failed and, in some cases, specify a reason for the failure.

In response to the start commands initiated by web applications 104, compute services 106 issues a command to target node 112M to cause container 114' to begin executing (226). As a result of the completion of the container migration workflow by web applications 104 invoking services of controller 102, a working container 114' with the same storage volume 130A and, at least in some cases, the same IP address and port is executing on a different node of computing infrastructure. The techniques in this way provide a seamless and scalable workflow for users to migrate containers from one infrastructure to another.

Compute services 106 may reply to web applications 104 with a status to indicate whether starting the container 114' was successful. If the starting was not successful, compute services 106 may reply with a reason for the error.

Web applications 104 may also output a notification of the status of the migration (228). The status of the migration may indicate that controller 102 is in the process of migrating container 114 to target node 112M for execution as container 114' was successful and is complete. If compute services 106 was unable to complete one or more of the tasks, web applications 104 may output an indication that the migration process has failed and, in some cases, specify a reason for the failure.

FIGS. 3A-3D are screen diagrams illustrating example details of a graphical user interface for migrating a container and outputting notifications of statuses of a container migration process, in accordance with one or more techniques of the disclosure. The screen diagrams illustrated in FIGS. 3A-3D include a graphical window 301 that may be output for display in a graphical user interface. For example, a client device (e.g., client device 138 shown in FIG. 1) may output a graphical user interface that includes graphical window 301 when executing a web application and/or displaying an output of a web application in a web browser, such as one of web applications 104 provided by controller node 102. For any of the example windows illustrated in FIGS. 3A-3D, the web browser of the client device may send requests to web applications 104, which may process and forward these requests to compute services 106, storage management services 108, and network services 110 illustrated in FIG. 1. Compute services 106, storage management services 108, and network services 110 may handle the requests and send responses to web applications 104, which provides the responses back to client device 138, including an output of the information included in the graphical windows illustrated in FIGS. 3A-3D. As a result, client device 138 may output a graphical user interface that includes these graphical windows.

Figure 3A:
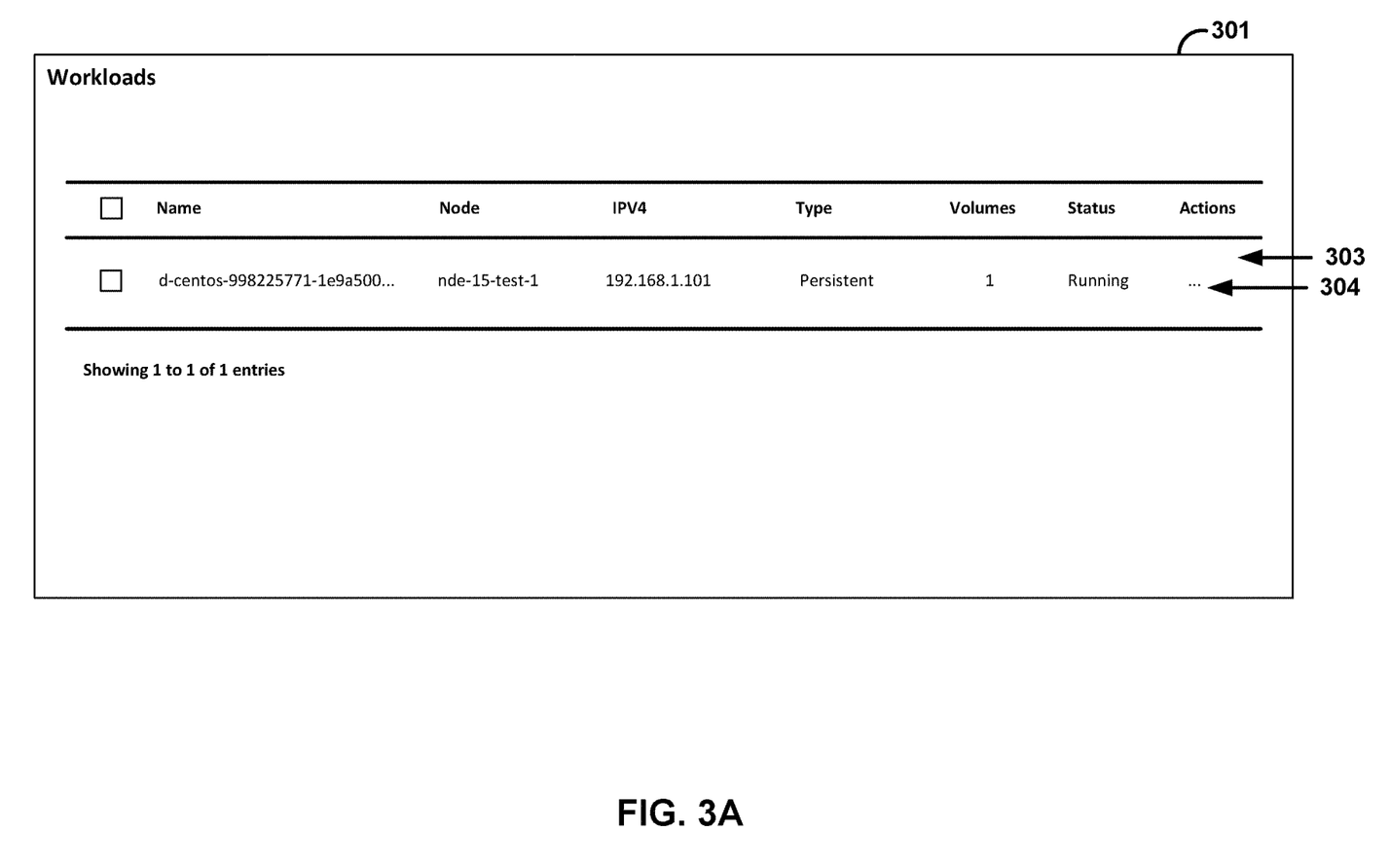
FIGS. 3A-3D are screen diagrams illustrating example details of a graphical user interface for migrating a container and outputting notifications of statuses of a container migration process, in accordance with one or more techniques of the disclosure.
Figure 3B:
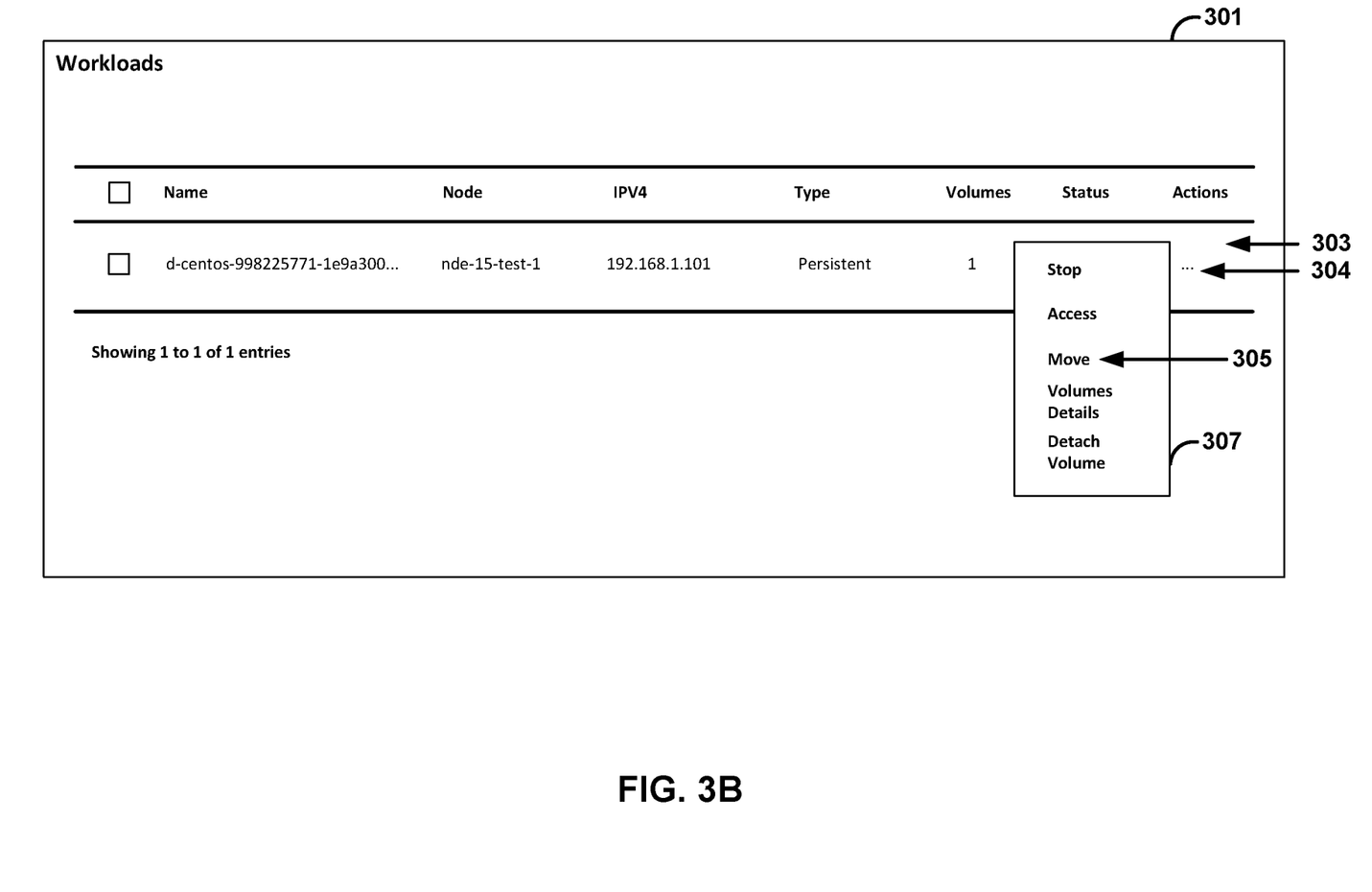

Window 301 as depicted in FIG. 3A includes example details of a workloads page, which in this example displays a display record 303 for a single container. In general, a workload refers to a container and one or more storage volumes attached to the container. The display record 303 displayed for the container indicates a name, current node ("nde-15-test-1"), IP address, type of container, number of volumes, and status (here, "Running") for the container. Also displayed is a prompt 304 for one or more actions that may be performed with respect to the container. When a user selects the prompt for the container associated with display record 303, controller 102 generates actions panel 307 for display, as depicted in FIG. 3B.

Figure 3C:
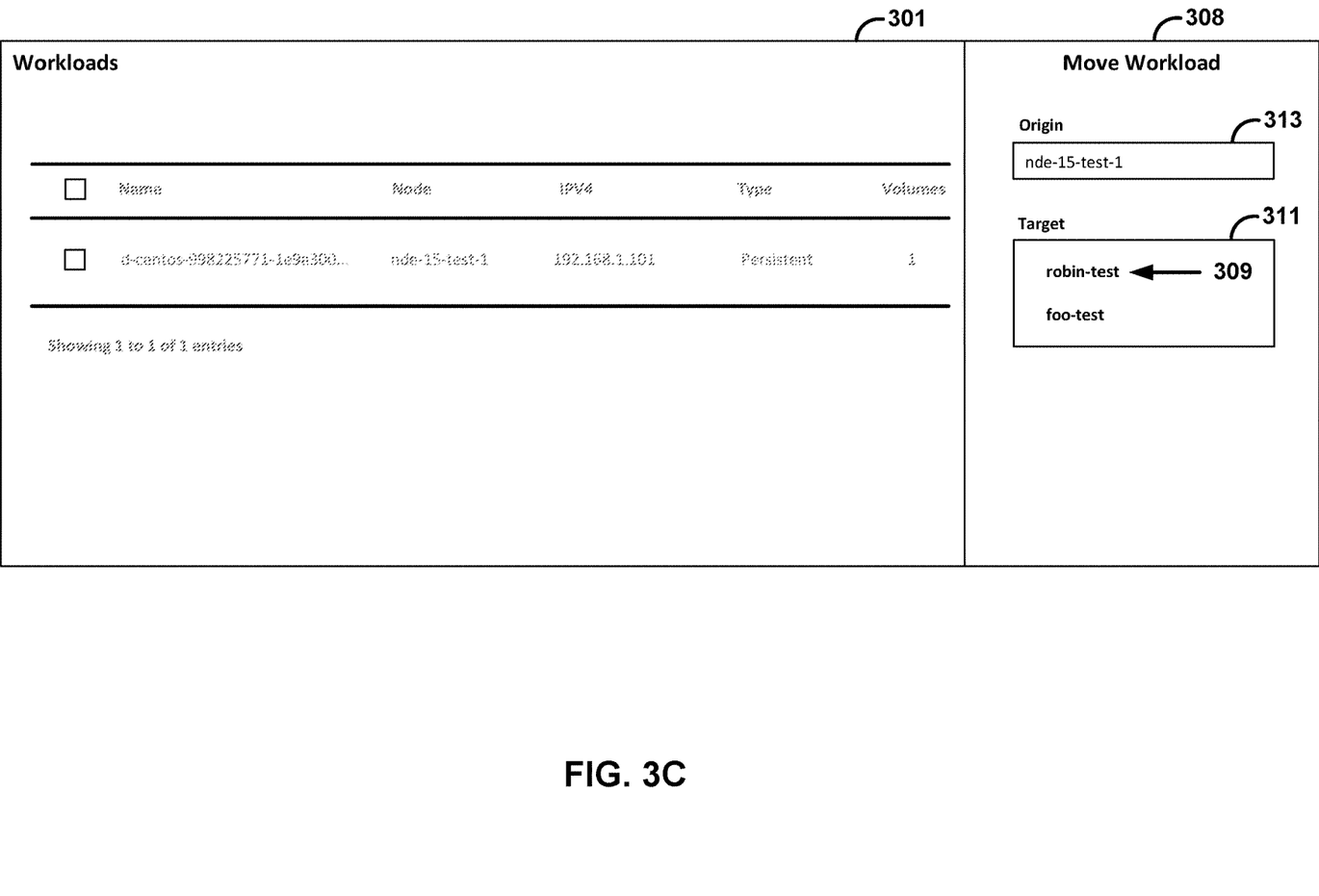

Actions panels 307 includes graphical interface elements to display options to Stop, Access, or Move a container, as well as obtain details of attached storage volumes ("Volumes Details"), and to detach a storage volume ("Detach Volume"). When a user selects the Move option 305, controller 102 generates Move Workload panel 308, as depicted in FIG. 3C. In some examples, Move option 305 is only displayed or available for containers that are of type Persistent, i.e., for persistent containers and if the container is executing (Status="Running"). In some examples, ephemeral containers currently executing may be moveable, in accordance with techniques of this disclosure.

Move workload panel 308 includes graphical interface element 313 indicating an identifier of the original node "nde-15-test-1" for the container being moved, and graphical interface element 311 indicating available target nodes for selection. In response to the user selecting target node "robin-test", which may be an example of target node 112M, controller 102 migrates the container for display record 303 to the target node "robin-test".

Figure 3D:
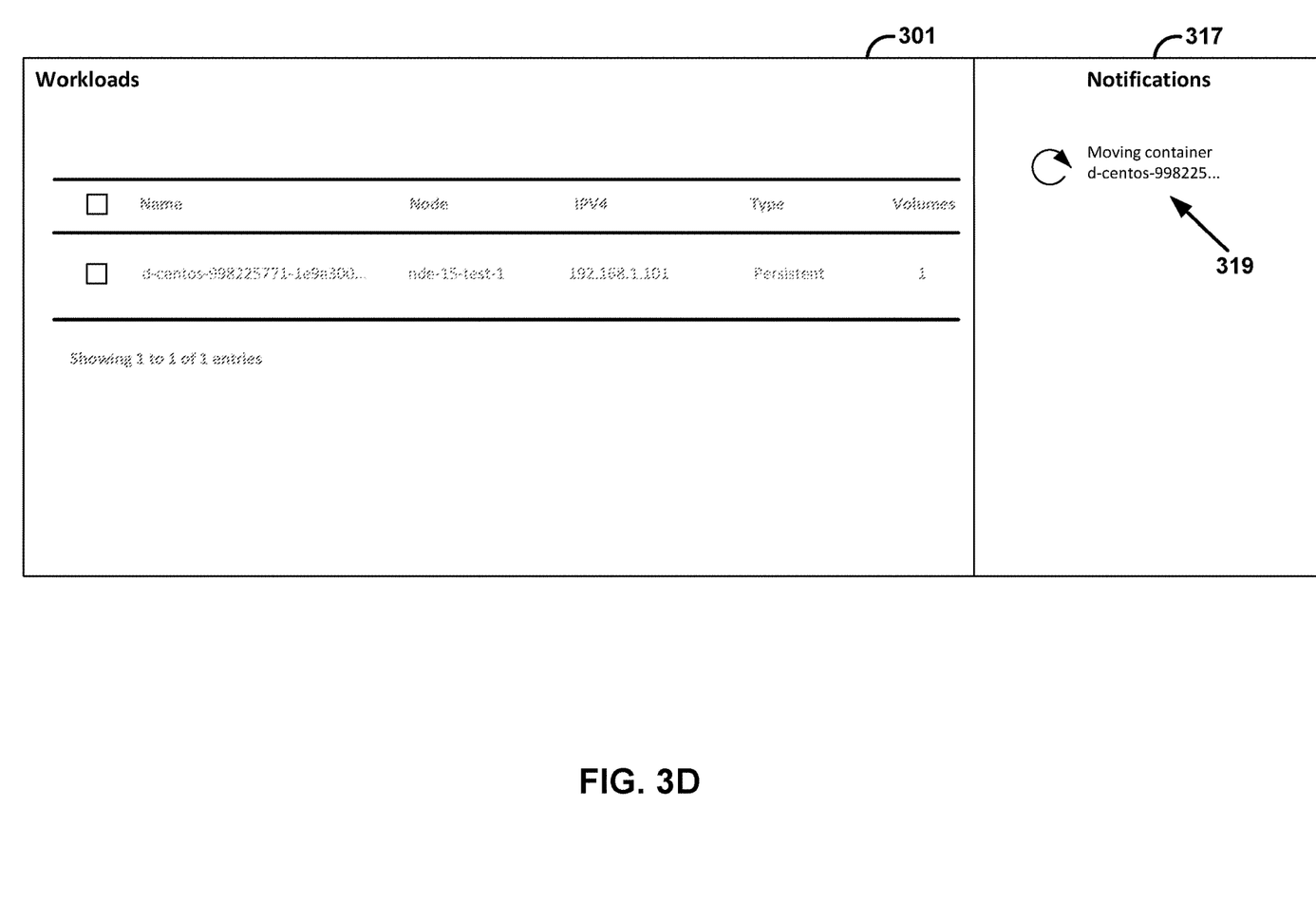

As part of the container migration process, controller 102 generates and displays Notifications panel 317, as depicted in FIG. 3D. Notifications panel 317 includes graphical interface elements 319 indicating a current status of the container migration. Examples statuses of a container migration may include those described above with respect to FIG. 2. As depicted in FIG. 3D, the current status of the container migration is "Moving Container". Other statuses depicted by graphical interface elements 319 may include "Configuring the Network Configuration", "Starting Container", "Migration Complete", and "Migration Failed".

Figure 4:
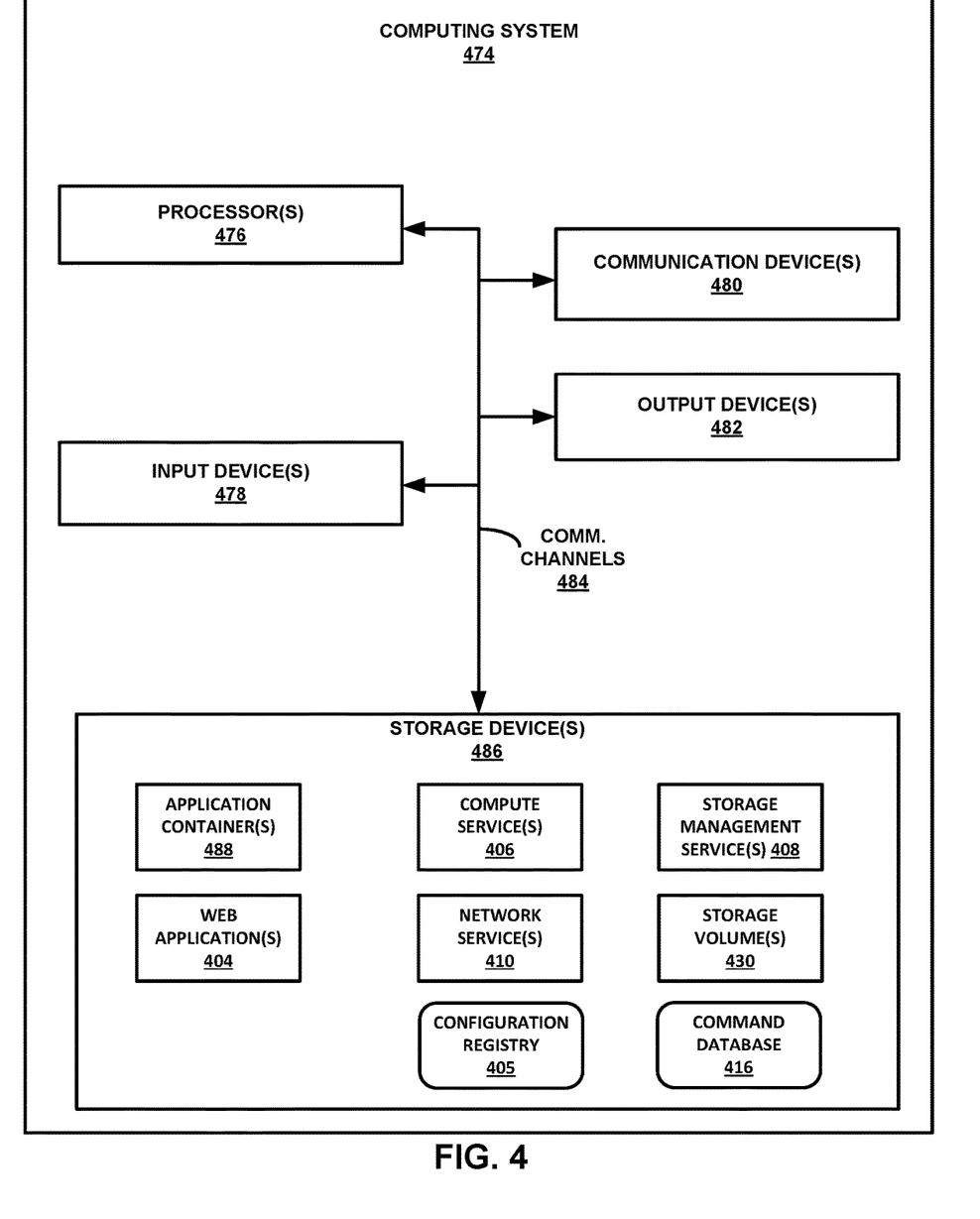
FIG. 4 is a block diagram illustrating an example computing system, in accordance with one or more techniques of the disclosure.

FIG. 4 is a block diagram illustrating an example computing system 474, in accordance with one or more techniques of the disclosure. Computing system 474 may include or implement one or more of the nodes, containers, applications, and/or services described herein and shown in FIG. 1, such as one or more of nodes 112, application containers 114 or 114', controller 102 and components thereof, such as web applications 104, compute services 106, storage management services 108 (including storage service 128 and storage microservice 120), network services 110, node 112A, node 112M, application containers 114 or 114', storage service 128, and/or storage microservice 120. FIG. 4 illustrates only one particular example of computing system 474, and many other examples of computing system 474 may be used in other instances and may include a subset of the components shown, or may include additional components not shown, in FIG. 4. Controller 102 may include multiple instances of a computing system 474, such as multiple real and/or virtual servers, to store and execute the various components depicted in FIG. 1. For example, a storage server may include a database to store configuration registry 105, a first server may execute an instance of web applications 104, a second server may execute an instance of network services 110, and so on.

As shown in the example of FIG. 4, computing system 474 includes one or more processors 476, one or more input devices 478, one or more communication devices 480, one or more output devices 482, and one or more storage devices 486. In some examples, computing system 474 may not include input devices 478 and/or output devices 482. Communication channels 484 may interconnect each of the components 476, 480, 478, 482, and 486 for inter-component communications (physically, communicatively, and/or operatively). In some examples, communication channels 484 may include a system bus, a network connection, an inter-process communication data structure, or any other method for communicating data between hardware and/or software.

One or more input devices 478 of computing system 474 may receive input. Examples of input are tactile, audio, and video input. Examples of input devices 478 include a presence-sensitive screen, touch-sensitive screen, mouse, keyboard, voice responsive system, video camera, microphone or any other type of device for detecting input from a human or machine.

One or more output devices 482 of computing system 474 may generate output. Examples of output are tactile, audio, and video output. Examples of output devices 482 include a presence-sensitive screen, sound card, video graphics adapter card, speaker, cathode ray tube (CRT) monitor, liquid crystal display (LCD), or any other type of device for generating output to a human or machine. Output devices 482 may include display devices such as cathode ray tube (CRT) monitor, liquid crystal display (LCD), or any other type of device for generating tactile, audio, and/or visual output.

One or more communication devices 480 of computing system 474 may communicate with one or more other computing systems or devices via one or more networks by transmitting and/or receiving network signals on the one or more networks. Examples of communication devices 480 include a network interface card (e.g. such as an Ethernet card), an optical transceiver, a radio frequency transceiver, or any other type of device that can send and/or receive information, such as through a wired or wireless network. Other examples of communication devices 480 may include short wave radios, cellular data radios, wireless Ethernet network radios, as well as universal serial bus (USB) controllers.

One or more storage devices 486 within computing system 474 may store information for processing during operation of computing system 474 (e.g., computing system 474 may store data accessed by one or more modules, processes, applications, services, nodes, application containers, or the like during execution at computing system 474). In some examples, storage devices 486 on computing system 474 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 486 may include redundant array of independent disks (RAID) configurations and one or more solid-state drives (SSD's).

Storage devices 486, in some examples, also include one or more computer-readable storage media. Storage devices 486 may be configured to store larger amounts of information than volatile memory. Storage devices 486 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 486 may store program instructions and/or data associated with one or more software/firmware elements or modules.

For example, storage devices 486 may store configuration registry 405 and command database 416. In addition, storage devices 486 may store instructions and/or data associated with application containers 488, web applications 404, compute services 406, network services 410, storage management services 408, and storage volumes 430. The components, registries, and databases stored in storage devices 486 may be examples of similarly named components shown in FIG. 1.

Computing system 474 further includes one or more processors 476 that may implement functionality and/or execute instructions within computing system 474. For example, processors 476 may receive and execute instructions stored by storage devices 486 that execute the functionality of the elements and/or modules described herein. These instructions executed by processors 476 may cause computing system 474 to store information within storage devices 486 during program execution. Processors 476 may also execute instructions of an operating system to perform one or more operations described herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:

receiving, by a controller comprising an application and a plurality of microservices, a migration request to migrate a currently executing first container from a node to a target node, wherein the first container has a storage volume attached to and for use by the first container to read and write application data, wherein the storage volume is located on a remote storage node; and in response to receiving the migration request, orchestrating, by the application of the controller, the microservices to perform container migration tasks comprising:

copying the first container from the node to the target node to create a second container that is a copy of the first container;

attaching the storage volume to the second container on the target node for use by the second container to read and write application data;

configuring the target node with a network configuration for the second container; and starting the second container to execute by the target node, wherein the microservices include one or more compute services executing on one or more nodes and one or more network services executing on one or more nodes, wherein each of the compute services exposes a first application programming interface, wherein each of the network services exposes a second application programming interface, and wherein, to orchestrate the microservices, for each of the container migration tasks, the application stores one or more commands to a command database to initiate the container migration task to be performed by one of the microservices, wherein each of the one or more commands invokes a method of the first application programming interface or the second application programming interface.

2. The method of claim 1, wherein the first container comprises a persistent container, and wherein the second container comprises a persistent container.

3. The method of claim 1, wherein the container migration tasks further comprise:

storing, to a container registry, a network configuration for the first container; and deleting the network configuration for the first container from the node, wherein the network configuration for the second container is the network configuration for the first container.

4. The method of claim 1, wherein the network configuration comprises a Media Access Control (MAC) address for the first container, and wherein the second container has a MAC address that is the MAC address for the first container.

5. The method of claim 4, wherein the second container obtains an Internet Protocol (IP) address from a Dynamic Host Configuration Protocol (DHCP) server using the MAC address for the first container, wherein the IP address returned by the DHCP server is an IP address formerly assigned to the first container.

6. The method of claim 1, wherein copying the first container comprises:

capturing a snapshot of the first container while the first container is executing on the node; and restoring the snapshot of the first container on the target node to create the second container.

7. The method of claim 6, wherein the snapshot includes running state for the first container, wherein restoring the snapshot of the first container on the target node includes restoring the running state for the first container within the second container on the target node.

8. The method of claim 1, wherein the container migration tasks further comprise:

storing, to a container registry, storage volume data for the first container; and detaching the storage volume from the first container, wherein attaching the storage volume to the second container comprises:

after copying the first container from the node to the target node, obtaining the storage volume data from the container registry; and attaching, using the storage volume data from the container registry, the storage volume to the second container on the target node.

9. The method of claim 1, further comprising:

outputting, by the controller, a user interface for presentation by a client device, wherein the user interface includes a list of one or more executing containers including the first container, and wherein the user interface presents a selectable option for a move operation for the first container that, when selected by a user, causes the client device to issue the migration request.

10. The method of claim 9, wherein the user interface presents a list of one or more nodes, including the target node, as selectable target node options for the move operation.

11. The method of claim 1, further comprising:

after initiating copying the first container from the node to the target node, outputting, by the controller, a status of the container migration tasks, the status indicating the controller is in the process of copying the first container from the node to the target node.

12. The method of claim 1, further comprising:

after initiating each of the container migration tasks, outputting, by the controller, a status of the container migration tasks, the status indicating that the controller is in the process of copying the first container from the node to the target node.

13. The method of claim 1, wherein performing each container migration task of the container migration tasks comprises:

invoking an application programming interface of a cloud service provider to cause a computing system of the cloud service provider to perform the container migration task.

14. A method comprising:

receiving, by a controller, a migration request to migrate a currently executing first container from a node to a target node, wherein the first container has a storage volume attached to and for use by the first container to read and write application data, wherein the storage volume is located on a remote storage node; and in response to receiving the migration request, performing, by the controller, container migration tasks comprising:

copying the first container from the node to the target node to create a second container that is a copy of the first container;

attaching the storage volume to the second container on the target node for use by the second container to read and write application data; and starting the second container to execute by the target node, wherein the controller comprises a plurality of microservices, the plurality of microservices including:

one or more compute services executing on one or more nodes; and one or more network services executing on one or more nodes, wherein the controller comprises an application that, in response to the migration request and according to a container migration workflow, orchestrates the microservices to perform the container migration tasks, wherein each of the compute services exposes a first application programming interface, wherein each of the network services exposes a second application programming interface, and wherein, to orchestrate the microservices, for each of the container migration tasks, the application stores one or more commands to a command database to initiate the container migration task to be performed by one of the microservices, wherein each of the one or more commands invokes a method of the first application programming interface or the second application programming interface.

15. A computing system, comprising:

an application;

a plurality of microservices, wherein each of the plurality of microservices includes one or more compute services that each expose a first application programming interface and one or more network services that each expose a second application programming interface;

one or more processors; and at least one computer-readable storage medium storing instructions that, when executed, cause the one or more processors to:

receive a migration request to migrate a currently executing first container from a node to a target node, wherein the first container has a storage volume attached to and for use by the first container to read and write application data, wherein the storage volume is located on a remote storage node; and in response to receiving the migration request, orchestrate, by the application, the microservices to perform container migration tasks that cause the one or more processors to:

copy the first container from the node to the target node to create a second container that is a copy of the first container;

attaching the storage volume to the second container on the target node for use by the second container to read and write application data;

configure the target node with a network configuration for the second container; and starting the second container to execute by the target node, wherein, to orchestrate the microservices, for each of the container migration tasks, the application stores one or more commands to a command database to initiate the container migration task to be performed by one of the microservices, wherein each of the one or more commands invokes a method of the first application programming interface or the second application programming interface.

16. The computing system of claim 15, wherein the first container comprises a persistent container, and wherein the second container comprises a persistent container.

17. The computing system of claim 15, further comprising:

a container registry, wherein the instructions cause the one or more processors to:

store, to the container registry, a network configuration for the first container;

configure the target node with the network configuration for the first container; and delete the network configuration for the first container from the node.

* * * * *